United States Patent
Park et al.

(10) Patent No.: US 11,487,054 B2
(45) Date of Patent: Nov. 1, 2022

(54) VIEWING ANGLE ADJUSTING FILM AND DISPLAY DEVICE INCLUDING THE SAME

(71) Applicant: LG Display Co., Ltd., Seoul (KR)

(72) Inventors: Suhyun Park, Busan (KR); Jounho Lee, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 217 days.

(21) Appl. No.: 17/071,868

(22) Filed: Oct. 15, 2020

(65) Prior Publication Data
US 2021/0124103 A1  Apr. 29, 2021

(30) Foreign Application Priority Data
Oct. 24, 2019  (KR) .................. 10-2019-0132974

(51) Int. Cl.
  *G02F 1/1335* (2006.01)
  *G02B 5/30* (2006.01)
(52) U.S. Cl.
  CPC .......... *G02B 5/3025* (2013.01); *G02F 1/1335* (2013.01); *G02F 1/133502* (2013.01)
(58) Field of Classification Search
  CPC ....... G02B 5/3025; G02B 5/30; G02F 1/1335; G02F 1/133502
  See application file for complete search history.

(56) References Cited

U.S. PATENT DOCUMENTS

2019/0094626 A1 * 3/2019 Yanai .................. G02B 5/3083

FOREIGN PATENT DOCUMENTS

| KR | 10-2011-0043459 A | 4/2011 |
| KR | 10-2014-0018293 A | 2/2014 |
| KR | 10-2014-0024209 A | 2/2014 |
| KR | 10-2015-0134347 A | 12/2015 |

* cited by examiner

*Primary Examiner* — Donald L Raleigh
(74) *Attorney, Agent, or Firm* — Polsinelli PC

(57) ABSTRACT

A viewing angle adjusting film includes a polarizing film having a transmission axis in a first direction and an optical film disposed on the polarizing film and including first areas having isotropy or anisotropy and second areas having anisotropy, the first areas and the second areas being alternately disposed. A refractive index of the second areas in the first direction is higher than a refractive index of the first areas in the first direction. Therefore, the optical film including first areas and second areas having different refractive indices is disposed on a polarizing film to thereby form a viewing angle adjusting film, so that diffusion and collection of light can be easily achieved.

20 Claims, 9 Drawing Sheets

VIEWING ANGLE ADJUSTING FILM AND DISPLAY DEVICE INCLUDING THE SAME

CROSS-REFERENCE TO RELATED APPLICATION

This application claims the priority benefit of Korean Patent Application No. 10-2019-0132974 filed on Oct. 24, 2019, which is hereby incorporated by reference in its entirety.

BACKGROUND

Field of the Disclosure

The present disclosure relates to a viewing angle adjusting film and a display device including the same, and more particularly, to a viewing angle adjusting film capable of effectively collecting and diffusing light and a display device including the same.

Description of the Background

Recently, as society advances toward an information-oriented society, the field of display devices for visually expressing electrical information signals has rapidly advanced. Various display devices, having excellent performance in terms of thinness, weight reduction, and low power consumption, are being developed correspondingly. Concrete examples of such display devices may include electroluminescence displays such as a liquid crystal display (LCD), an organic light emitting display (OLED), a quantum dot light emitting display (QLED), and the like.

A viewing angle adjusting film or the like for improving viewing angle characteristics may be disposed in front of a display device. In general, the viewing angle adjusting film is configured such that low refractive areas and high refractive areas are alternately disposed. The viewing angle adjusting film may adjust a viewing angle of the display device by using refraction of light at boundary surfaces between the low refractive areas and the high refractive areas.

SUMMARY

Accordingly, the present disclosure is to provide a viewing angle adjusting film capable of collecting and diffusing light through an optical film including first areas and second areas that have different refractive indices.

The present disclosure is also to provide a viewing angle adjusting film capable of simplifying a process and reducing a cost by forming an optical film through a simple patterning process.

The present disclosure is also to provide a viewing angle adjusting film including an optical film having a fine pitch of several μm through a patterning process by UV irradiation.

The present disclosure is also to provide a display device capable of easily adjusting a viewing angle by disposing a viewing angle adjusting film on a display panel.

The present disclosure is not limited to the above-mentioned objects, and other objects, which are not mentioned above, can be clearly understood by those skilled in the art from the following descriptions.

According to an aspect of the present disclosure, there is provided a viewing angle adjusting film. The viewing angle adjusting film includes a polarizing film having a transmission axis in a first direction. The viewing angle adjusting film further includes an optical film disposed on the polarizing film and including first areas having isotropy or anisotropy and second areas having anisotropy, the first areas and the second areas being alternately disposed. A refractive index of the second areas in the first direction is higher than a refractive index of the first areas in the first direction.

According to another aspect of the present disclosure, there is provided a viewing angle adjusting film. The viewing angle adjusting film includes a base substrate. The viewing angle adjusting film further includes an optical film disposed on the base substrate and including a photo-alignment liquid crystal compound. The optical film includes first areas and second areas that are alternately disposed on the same plane. Reflective indices of the first areas are $ny1 \geq nx1 = nz1$, reflective indices of the second areas are $ny2 > nx2 = nz2$, and $ny2 > ny1 \geq nx1 = nx2 = nz1 = nz2$.

According to yet another aspect of the present disclosure, there is provided a display device. The display device includes a display panel. The display device further includes a viewing angle adjusting film on the display panel. The viewing angle adjusting film includes a polarizing film having a transmission axis parallel to a Y-axis and an optical film including a photo-alignment liquid crystal compound on the polarizing film. The optical film includes first areas and second areas that are alternately disposed on the same plane. Refractive indices of the first areas are $ny1 \geq nx1 = nz1$, refractive indices of the second areas are $ny2 > nx2 = nz2$, and $ny2 > ny1 \geq nx1 = nx2 = nz1 = nz2$.

Other detailed matters of the exemplary aspects are included in the detailed description and the drawings.

According to the present disclosure, a viewing angle adjusting film can be formed in an inexpensive and simple process by forming an optical film in which low refractive areas and high refractive areas are alternately disposed in a single layer through patterning.

According to the present disclosure, the low refractive areas and the high refractive areas of the optical film can be formed to have a fine pitch of several μm through a patterning process by UV irradiation.

According to the present disclosure, the optical film including the low refractive areas and the high refractive areas having different refractive indices is disposed on a polarizing film to thereby form a viewing angle adjusting film, so that diffusion and collection of light can be easily achieved.

According to the present disclosure, a viewing angle of a display device may be adjusted by disposing the viewing angle adjusting film on a display panel.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
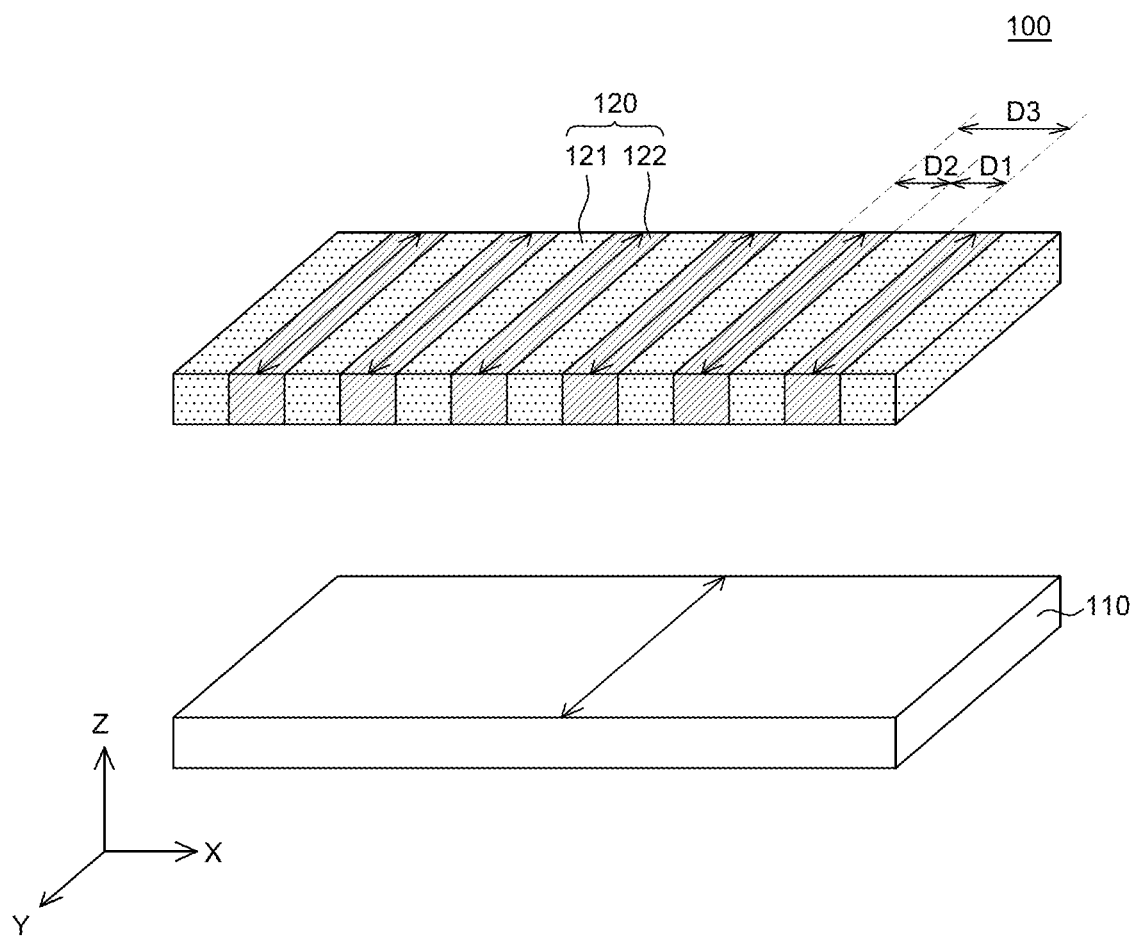
FIG. 1 is a perspective view of a viewing angle adjusting film according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the exemplary aspects disclosed herein but will be implemented in various forms. The exemplary aspects are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various aspects of the present disclosure can be partially or entirely adhered to or combined with each other and can be interlocked and operated in technically various ways, and the aspects can be carried out independently of or in association with each other.

Hereinafter, the present disclosure will be described in detail with reference to accompanying drawings.

FIG. 1 is a perspective view of a viewing angle adjusting film according to an exemplary aspect of the present disclosure.

With reference to FIG. 1, a viewing angle adjusting film 100 includes a polarizing film 110 and an optical film 120. The viewing angle adjusting film 100 is disposed on a display panel to improve viewing angle characteristics of a display device. The display device to which the viewing angle adjusting film 100 is applied will be described later with reference to FIG. 6.

The polarizing film 110 is a film for polarizing light incident on the viewing angle adjusting film 100. Specifically, the polarizing film 110 has a transmission axis parallel to a first direction illustrated by an arrow in FIG. 1 and thus, transmits light incident in the first direction. The polarizing film 110 may be a multilayer structure including a polarizing layer and a protective layer, but is not limited thereto. Meanwhile, the first direction may be a Y-axis direction of FIG. 1. In addition, hereinafter, for convenience of description, an X-axis direction of FIG. 1 is defined as a second direction, and a Z-axis direction of FIG. 1 is defined as a third direction. That is, the first direction and the second direction may be perpendicular to each other on the same plane, and the third direction may be perpendicular to the first direction and the second direction in a thickness direction.

The polarizing layer may extract only light that vibrates in one direction from light incident while vibrating in various directions. The polarizing layer may be formed by adsorbing halogen salt crystals such as iodine into a poly-vinyl alcohol (PVA) film, and then, stretching the PVA film in a specific direction so that iodine crystals are aligned parallel to the stretching direction. The iodine crystals may perform polarization functions, for example, by transmitting light incident in the first direction and absorbing light incident in the second direction perpendicular to the first direction.

The protective layer is a film that supports and protects the polarizing layer. The protective layer may be disposed on one surface or both surfaces of the polarizing layer. The protective layer may be formed of a material which is optically transparent, is not birefringent, and has heat resistance and high mechanical strength. In addition, the protective layer may have properties capable of sufficiently bonding with an adhesive or a gluing agent. For example, the protective layer may be formed of an acetate-based resin such as triacetyl cellulose (TAC), a polyester-based resin, a polyether sulfone-based resin, a polycarbonate-based resin, a polyamide-based resin, a polyimide-based resin, a polyolefin-based resin, an acrylic-based resin, a polynorbornene-based resin, or the like.

An adhesive layer is disposed between the polarizing layer and the protective layer to bond the polarizing layer and the protective layer.

The optical film 120 is disposed on the polarizing film 110. The optical film 120 may collect or diffuse light transmitted through the polarizing film 110. Specifically, the optical film 120 may include a plurality of first areas 121 and a plurality of second areas 122 having different refractive indices. In this case, the plurality of first areas 121 may be low refractive areas, and the plurality of second areas 122 may be high refractive areas. The plurality of first areas 121 and the plurality of second areas 122 may be alternately disposed on the same plane. In addition, boundary surfaces between the first areas 121 and the second areas 122 may be perpendicular to the polarizing film 110. Light incident on the optical film 120 may be collected or diffused by being refracted at the boundary surfaces between the first areas 121 and the second areas 122 having different refractive indices. In FIG. 1, for convenience of illustration, the optical film 120 is illustrated as including seven first areas 121 and six second areas 122, but the present disclosure is not limited thereto.

The first area 121 may be an area having isotropy in the optical film 120. That is, the first area 121 may have the same refractive index in all of the first direction (a Y-axis direction), the second direction (an X-axis direction), and the third direction (a Z-axis direction). In other words, a refractive index ny1 of the first area 121 in the first direction, a refractive index nx1 of the first area 121 in the second direction, and a refractive index nz1 of the first area 121 in the third direction are all the same (nx1=ny1=nz1).

The second area 122 may be an area having anisotropy in the optical film 120. Specifically, the second area 122 may have the same refractive index in the second direction and the third direction, but a refractive index of the second area 122 in the first direction may be different from the refractive index thereof in the second direction and the third direction. That is, a refractive index ny2 of the second area 122 in the first direction, a refractive index nx2 of the second area 122 in the second direction, and a refractive index nz2 of the second area 122 in the third direction may have a relationship of ny2>nx2=nz2. The first direction in which the refractive index is the highest in the second area 122 may be parallel to the transmission axis of the polarizing film 110.

The optical film 120 may be formed by disposing a mask on an isotropic layer and performing patterning by irradiating ultraviolet (UV). That is, an area of the isotropic layer where UV light is blocked by the mask may maintain isotropy and become the first area 121, and an area of the isotropic layer which is exposed by the mask and through which UV light is transmitted may exhibit anisotropy and become the second area 122. In particular, the area through which UV light is transmitted has an increased refractive index in the first direction and thus, may form the second area 122. Accordingly, the refractive indices of the first area 121 and the second area 122 in the first direction, the second direction, and the third direction may have a relationship of ny2>ny1=nx1=nx2=nz1=nz2. In addition, since the optical film 120 is formed through patterning by UV, the optical film 120 may be formed to have a fine pitch of several μm. A method of manufacturing the optical film 120 will be described later with reference to FIGS. 3A to 3D.

Meanwhile, the first area 121 may be formed to have anisotropy. Specifically, the first area 121 may have the same refractive index in the second direction and the third direction, but a refractive index of the first area 121 in the first direction may be different from the refractive index thereof in the second direction and the third direction. That is, a refractive index ny1 of the first area 121 in the first direction, a refractive index nx1 of the first area 121 in the second direction, and a refractive index nz1 of the first area 121 in the third direction may have a relationship of ny1>nx1=nz1. In this case, the first direction in which the refractive index is the highest in the first area 121 may be parallel to the transmission axis of the polarizing film 110. Also, the refractive index of the first area 121 in the first direction is smaller than that of the second area 122 in the first direction. Accordingly, the refractive indices of the first area 121 and the second area 122 in the first direction, the second direction, and the third direction may have a relationship of ny2>ny1>nx1=nx2=nz1=nz2.

In a case in which the first area 121 has anisotropy, the optical film 120 may be formed by primarily irradiating UV on the entirety of an isotropic layer to form an anisotropic layer and then, secondarily irradiating UV only on a partial area of the anisotropic layer, in which a high refractive index will be formed, with the use of a mask. That is, an area in which UV light is blocked by the mask may maintain anisotropy by primary UV irradiation and may be the first area 121. In addition, the area which is exposed by the mask and through which UV light is transmitted may be the second area 122 having a refractive index higher than that of the first area 121. However, the method of manufacturing the optical film 120 is not limited thereto.

The area through which UV light is transmitted may have an increased refractive index in the first direction. That is, the first area 121 and the second area 122 have the highest refractive indices in the first direction. Also, the second area 122 may have birefringence greater than that of the first area 121. That is, the refractive index of the second area 122 in the first direction may be higher than that of the first area 121 in the first direction.

Hereinafter, for convenience of explanation, the first area 121 of the optical film 120 is described as having isotropy, and the second area 122 of the optical film 120 is described as having anisotropy, but the present disclosure is not limited thereto. The first area 121 and the second area 122 may both have anisotropy. That is, as long as the refractive index of the second area 122 in the first direction is higher than that of the first area 121 in the first direction, the first area 121 may have either of isotropy and anisotropy.

As illustrated by an arrow of FIG. 1, a direction of an optical axis in which the refractive index of the optical film 120 increases may be the same as a direction of the transmission axis of the polarizing film 110. In other words, the second area 122 has the highest refractive index in the first direction among the first direction, the second direction, and the third direction. Also, the refractive index of the second area 122 in the first direction is higher than that of the first area 121 in the first direction. In addition, the polarizing film 110 has a transmission axis in the first direction. Therefore, light vibrating in the first direction may pass through the polarizing film 110 and be incident on the optical film 120. A path of the light incident on the optical film 120 may be adjusted due to a difference in refractive indices of the first area 121 and the second area 122 in the first direction, whereby the light incident on the optical film 120 may be collected or diffused. That is, the light incident on the optical film 120 may be collected or diffused by being refracted at the boundary surface between the first area 121 and the second area 122.

The difference in refractive indices of the first area 121 and the second area 122 in the first direction may be 0.02 or more, and specifically, may be 0.02 to 0.4. When the difference in refractive indices of the first area 121 and the second area 122 in the first direction is less than 0.02, the light may not be sufficiently refracted at the boundary surface between the first area 121 and the second area 122. Therefore, collection or diffusion of the light passing through the optical film 120 may not be sufficiently performed.

With reference to FIG. 1, the first area 121 has a first width D1, the second area 122 has a second width D2, and the sum of the first width D1 and the second width D2 may be defined as a pitch D3. The optical film 120 may be formed to have a fine pitch of several μm. Specifically, the optical film 120 may be patterned to have a pitch of 20 μm or less. In this case, each of the first width D1 and the second width D2 may be formed to 10 μm or less, but is not limited thereto. That is, the first width D1 and the second width D2 may be formed differently. In particular, the optical film 120 may be formed with a fine pitch of about 2 μm. When the viewing angle adjusting film 100 including the optical film 120 having the fine pitch is applied to the display device, a moire phenomenon can be minimized to improve display quality.

The optical film 120 may include a photo-alignment liquid crystal compound. Hereinafter, photo-alignment liquid crystal compounds will be described with reference to FIGS. 2A and 2B.

Figure 2A:
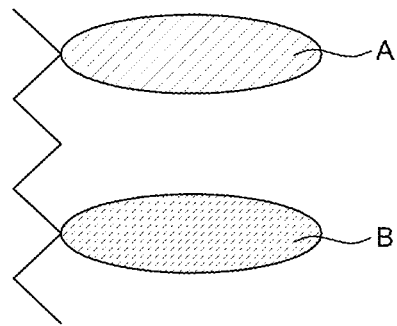
FIGS. 2A and 2B are configuration diagrams of photo-alignment liquid crystal compounds according to various exemplary aspects of the present disclosure.
Figure 2B:
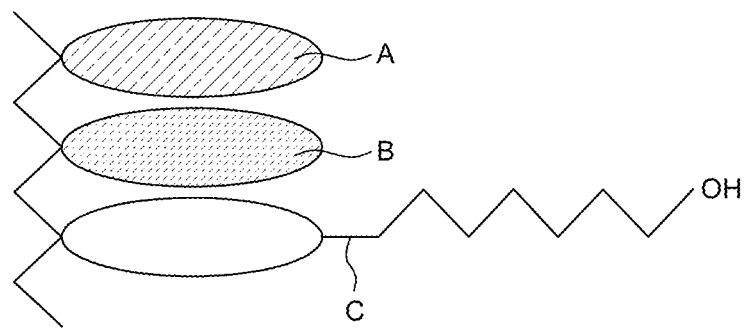

FIGS. 2A and 2B are configuration diagrams of photo-alignment liquid crystal compounds according to various exemplary aspects of the present disclosure.

With reference to FIG. 2A, the photo-alignment liquid crystal compound includes a liquid crystal functional group A and a photo-alignment functional group B. The photo-alignment liquid crystal compound may be a monomer or a polymer including both the liquid crystal functional group A and the photo-alignment functional group B.

The liquid crystal functional group A is a functional group derived from a polymerizable liquid crystal compound and imparts liquid crystal properties to the photo-alignment liquid crystal compound. When the photo-alignment liquid crystal compound is a polymer, the liquid crystal functional group A is a functional group formed from the polymerizable liquid crystal compound, and means a remaining functional group after copolymerization by a polymerizable functional group of the polymerizable liquid crystal compound.

The polymerizable liquid crystal compound may mean a compound including a site capable of exhibiting liquid crystallinity and at least one polymerizable functional group. For example, the polymerizable liquid crystal compound may be a liquid crystal compound including a liquid crystalline site such as a mesogen skeleton, and a polymerizable functional group formed at a terminal thereof, such as a (meth) acrylate group, but is not limited thereto. That is, the polymerizable liquid crystal compound may be used without limitation as long as it is a liquid crystal material including a polymerizable functional group formed at a terminal thereof.

The photo-alignment functional group B is a functional group derived from a polymerizable photo-alignment compound and imparts photo-alignment properties to the photo-alignment liquid crystal compound. When the photo-alignment liquid crystal compound is a polymer, the photo-alignment functional group B is a functional group formed from the polymerizable photo-alignment compound and means a remaining functional group after copolymerization by a polymerizable functional group of the polymerizable photo-alignment compound.

The polymerizable photo-alignment compound may mean a compound including a site capable of exhibiting photo-alignment properties and at least one polymerizable functional group. For example, the polymerizable photo-alignment compound may be a photo-alignment compound including a photo-alignment site formed of a photo-alignment material and a polymerizable functional group formed at a terminal thereof, such as a (meth) acrylate group, but is not limited thereto. That is, the polymerizable photo-alignment compound may be used without limitation as long as it is a photo-alignment material including a polymerizable functional group at a terminal thereof.

For example, a photo-polymerizable material may be a cinnamate-based material, a photo-isomerizable material may be an azo-based material, and a photo-degradable material may be a cyclic imide (polyimide) including cyclobutane dianhydride (CBDA). More specifically, the polymerizable photo-alignment compound may be a (meth) acrylate-based polymer, a cycloolefin-based polymer, or a siloxane-based polymer. And, a photo-isomerizable polymer having an azo site as a photosensitive site so as to align the liquid crystal functional group, a photo-dimerization polymer having a cinnamate site or a chalcone site, or a photo-degradable polymer having a cyclobutane site can be used for the polymerizable photo-alignment compound. The photo-dimerization polymer may include a (meth) acrylate-based polymer, a cycloolefin-based polymer, a siloxane-based polymer or the like. And, a cycloolefin-based polymer or a (meth) acrylate-based polymer having a cinnamate structure or a chalcone structure as the photo-dimerization site in a side chain of this polymer may be used.

When irradiating UV to the photo-alignment liquid crystal compound, the photo-alignment functional group B is aligned in a specific direction by a chemical reaction of the photo-alignment functional group B, so that the liquid crystal functional group A within the same molecule aligns in one direction. For example, when the photo-alignment functional group B of the photo-alignment liquid crystal compound is formed of a photo-isomerizable material, the photo-alignment functional group is aligned while being changed to a cis or trans configuration by a photoisomerization reaction, so that the liquid crystal functional group A may be arranged in one direction.

With reference to FIG. 2B, the photo-alignment liquid crystal compound may further include a liquid crystal functional group C including a hydroxyl group (—OH) or an alkyl group substituted with the hydroxyl group in order to improve mobility of molecules.

The optical film 120 may further include a general liquid crystal compound, in addition to the photo-alignment liquid crystal compound. For example, the optical film 120 may further include a liquid crystal monomer or a liquid crystal polymer, together with the photo-alignment liquid crystal compound shown in FIG. 2A or 2B, which includes both the liquid crystal functional group A and the photo-alignment functional group B. For example, when the liquid crystal monomer is further included in the optical film 120, high refractive index characteristics of the optical film 120 may be improved. In addition, when the liquid crystal polymer having a high molecular weight is included in the optical film 120, reliability of the optical film 120 may be improved through immobilization of the liquid crystal functional group A.

Hereinafter, a method of manufacturing the viewing angle adjusting film 100 will be described in detail with reference to FIGS. 3A to 3D.

FIGS. 3A to 3D are cross-sectional views sequentially illustrating a method of manufacturing the viewing angle adjusting film according to an exemplary aspect of the present disclosure.

Figure 3A:
FIGS. 3A to 3D are cross-sectional views sequentially illustrating a method of manufacturing the viewing angle adjusting film according to an exemplary aspect of the present disclosure.

With reference to FIG. 3A, an isotropic layer 120' is formed by coating a composition including a photo-alignment liquid crystal compound on a support film 101 and then, performing heat treatment. At this time, the heat treatment (prebaking) may be conducted for 4 minutes at 70 □.

The composition including the photo-alignment liquid crystal compound is a composition in which the photo-alignment liquid crystal compound is dissolved in an organic solvent. At this time, as the organic solvent, toluene, anisole, N, N-dimethylformamide (DMF), dimethyl sulfoxide (DMSO), N, N-dimethylacetamide (DMAc), m-cresol, 1,3-dimethyl-2-imidazolidinone (DMI), N-methyl-2-pyrrolidone (NMP), butyl cellosolve (BC), butyl carbitol acetate (BCA), methyl isobutyl ketone (MIBK), cycloheptanone, cyclohexanone, cyclopentanone, cyclopentyl methyl ether (CPME), propylene glycol methyl ether (PGM), and propylene glycol methyl ether acetate (PMA) may be used, but the organic solvent is not limited thereto.

The composition including the photo-alignment liquid crystal compound is a material including both the liquid crystal functional group and the photo-alignment functional group, and is already described in FIGS. 2A and 2B. Thus, a duplicate description will be omitted. The composition including the photo-alignment liquid crystal compound may further include a liquid crystal monomer or a liquid crystal polymer.

The support film 101 may be a film for supporting the isotropic layer 120' when the optical film 120 is formed.

The isotropic layers 120' include the same material and thus, have the same refractive index in the first direction, the second direction, and the third direction. That is, the refractive index of the isotropic layer 120' may have a relationship of $nx1=ny1=nz1$.

Figure 3B:
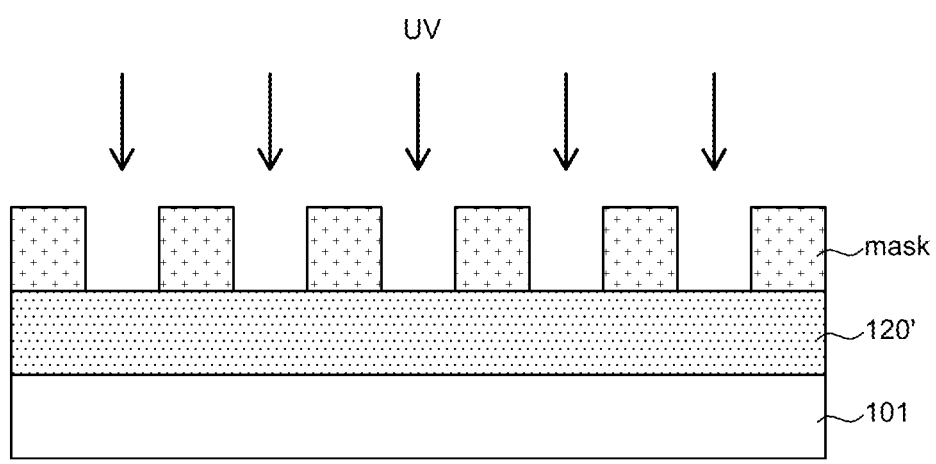

With reference to FIG. 3B, a mask is disposed on the isotropic layer 120', and the isotropic layer 120' is irradiated with UV light and is subjected to exposure. Areas of the isotropic layer 120' on which UV are irradiated exhibit anisotropy and may be patterned to have birefringence. In addition, the anisotropic areas may be patterned to correspond to a pattern size and shape of the mask. In addition, a refractive index of the anisotropic area and an anisotropic optical axis can be adjusted according to UV irradiation energy and an UV irradiation direction.

Specifically, the photo-alignment liquid crystal compound of the isotropic layer 120' may be aligned in a specific direction by exposure. For example, when polarized UV is used for exposure, the photo-alignment liquid crystal compound may be aligned in a direction perpendicular to the polarized UV, but the present disclosure is not limited thereto. That is, in the photo-alignment liquid crystal compound, the photo-alignment functional group may react with UV and thus, be self-aligned in the first direction. As the photo-alignment functional group is aligned in a specific direction, the liquid crystal functional group, a main chain of which is connected to the photo-alignment functional group, is also aligned together. Accordingly, the exposure area of the isotropic layer 120' may be aligned to have an optical axis in the first direction without an alignment film and thus, have anisotropy. In particular, the exposure area of the isotropic layer 120' has an increased refractive index in the first direction compared to an un-exposure area to thereby form birefringence having different refractive indices according to directions.

Figure 3C:
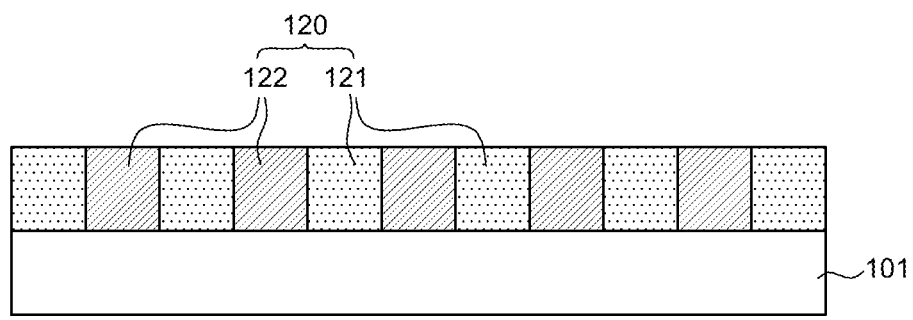

With reference to FIG. 3C, heat treatment is conducted after the exposure of the isotropic layer 120', whereby the optical film 120 in which the first areas 121 and the second areas 122 are alternately formed. At this time, the heat treatment (post baking) may be performed for 20 minutes at 100 □. The first area 121 of the optical film 120 may be a low refractive area which is not irradiated with UV, and the second area 122 may be a high refractive area which is irradiated with UV. That is, the optical film 120 may be patterned such that the first areas 121 and the second areas 122 are alternately disposed in a plane.

Since the first area 121 is not irradiated with UV, it may have a refractive index relationship of $nx1=ny1=nz1$ in the same manner as the initial isotropic layer 120'. On the other hand, the second area 122 which is irradiated with UV may have a refractive index relationship of $ny2>nx2=nz2$ due to an increase in refractive index in the first direction. In addition, an overall refractive index of the optical film 120 may have a relationship of $ny2>ny1=nx1=nx2=nz1=nz2$. That is, the optical film 120 may be patterned such that the first areas 121 and the second areas 122 having different refractive indices in the first direction are alternately disposed.

Figure 3D:
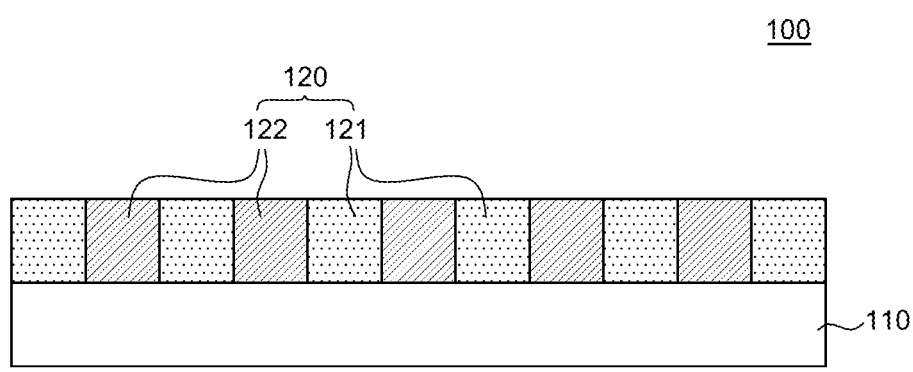

With reference to FIG. 3D, the viewing angle adjusting film 100 is formed by removing the support film 101 and attaching the polarizing film 110 to a lower portion of the optical film 120. At this time, the polarizing film 110 may have a transmission axis in the first direction. In addition, the direction (the first direction) in which the refractive index of the optical film 120 increases and the transmission axis (the first direction) of the polarizing film 110 may be arranged to coincide with each other. Therefore, light vibrating in the first direction may be diffused or collected through the polarizing film 110 and the optical film 120. That is, since the first area 121 and the second area 122 have different refractive indices in the first direction, a path of the light vibrating in the first direction may be bent at the boundary surface between the first area 121 and the second area 122 due to the difference in refractive indices. For example, when the light is bent to the outside of the viewing angle adjusting film 100 at the boundary surface between the first area 121 and the second area 122, the light may be diffused. In addition, when the light is bent to the inside of the viewing angle adjusting film 100 at the boundary surface between the first area 121 and the second area 122, the light may be collected.

In FIGS. 3A to 3D, the first area 121 is described as having isotropy, but the first area 121 may be formed to have anisotropy. For example, UV is irradiated on the entirety of the isotropic layer 120' to form an anisotropic layer having birefringence. At this time, the anisotropic layer may have an increased refractive index in the first direction. Thereafter, a mask is disposed on the anisotropic layer, and UV is additionally irradiated thereon. Therefore, an area exposed by the mask may be patterned to have an increase in birefringence. That is, the refractive index of the first area 121 which is not exposed by the mask may have a relationship of $ny1>nx1=nz1$. The second area 122 exposed by the mask may have a relationship of $ny2>nx2=nz2$. In addition, the overall refractive index of the optical film 120 may have a relationship of $ny2>ny1>nx1=nx2=nz1=nz2$.

A general viewing angle adjusting film is formed of an imprint method or an embossing roll method. In the case of the imprint method, a stamp is first disposed on a high refractive layer coated on a substrate, and UV light is irradiated thereon to form high refractive patterns in the high refractive layer. Further, a low refractive layer is coated on the high refractive layer to fill gaps between the high refractive patterns, whereby a viewing angle adjusting film is formed. In the case of the viewing angle adjusting film formed by the imprint method, since the high refractive layer and the low refractive layer are formed, respectively, two materials are required therefor. Therefore, the imprint method has a disadvantage that a process time and cost increases. In addition, the imprint method has a disadvantage in that it is difficult to prepare a stamp with a fine pitch for forming a high refractive pattern, thereby causing difficulty in implementing a pattern having a pitch of 20 μm or less.

The viewing angle adjusting film 100 according to the present disclosure includes the polarizing film 110 and the optical film 120. The optical film 120 may be formed such that the first areas 121 and the second areas 122 having different refractive indices are alternately disposed. At this time, the refractive index of the second area 122 in the first direction is higher than that of the first area 121 in the first direction. In addition, the polarizing film 110 may have a transmission axis in the first direction. The light passing through the polarizing film 110 and vibrating in the first direction may be refracted at the boundary surface between the first area 121 and the second area 122 having different refractive indices in the first direction. Therefore, the viewing angle adjusting film 100 is applied to a display device to thereby collect or diffuse front light laterally, so that viewing angle characteristics of the display device can be improved.

The optical film 120 according to the present disclosure may be formed by patterning the photo-alignment liquid crystal compound. That is, the first area 121 and the second area 122 having different refractive indices may be formed in a single layer. Specifically, the photo-alignment liquid crystal compound may exhibit anisotropy by UV light or heat. Therefore, by irradiating UV light on an isotropic layer including the photo-alignment liquid crystal compound with the use of a mask, an anisotropic area having a high refractive index may be patterned only in an exposed area of the isotropic layer. That is, the first area 121 which is a low refractive isotropic area not irradiated with UV light, and the second area 122 which is a high refractive anisotropic area irradiated with UV light, may be alternately disposed in a single layer. Alternatively, when both the first area 121 and the second area 122 have anisotropy, only the refractive index of the second area 122 may be increased through patterning. Therefore, the optical film 120 is formed by a simple patterning process, whereby the process may be simplified and a manufacturing cost may be reduced.

The photo-alignment liquid crystal compound may include a liquid crystal functional group having liquid crystal properties and a photo-alignment functional group having photo-alignment properties. Therefore, the second areas 122 of the optical film 120 may be self-aligned by the reaction of the photo-alignment functional group, without a separate alignment film. That is, since the alignment film may be omitted when forming the optical film 120, a process may be further simplified and a manufacturing cost may be further reduced.

In the optical film 120 according to the present disclosure, since the second areas 122 may be patterned by irradiating UV using a mask, it is feasible to form a fine pitch pattern, as compared to the imprint or embossing roll method. Specifically, in the case of the imprint or embossing roll method, it is difficult to implement a pattern of 20 μm or less in a stamp for pattern formation. In addition, when an optical film having a large pattern pitch is applied to a display device, there is a problem in that a moire phenomenon occurs. However, in the optical film 120 according to the present disclosure, a pattern of 20 μm or less is formed on a mask and then, a photo-alignment liquid crystal compound is exposed with the use of the mask, whereby the first area 121 and the second area 122 may be formed with a fine pitch. In particular, the optical film 120 according to the present disclosure may be implemented to have a pitch of 2 μm. Therefore, a moire phenomenon of a display device may be minimized, thereby improving quality of the display device.

Figure 4A:
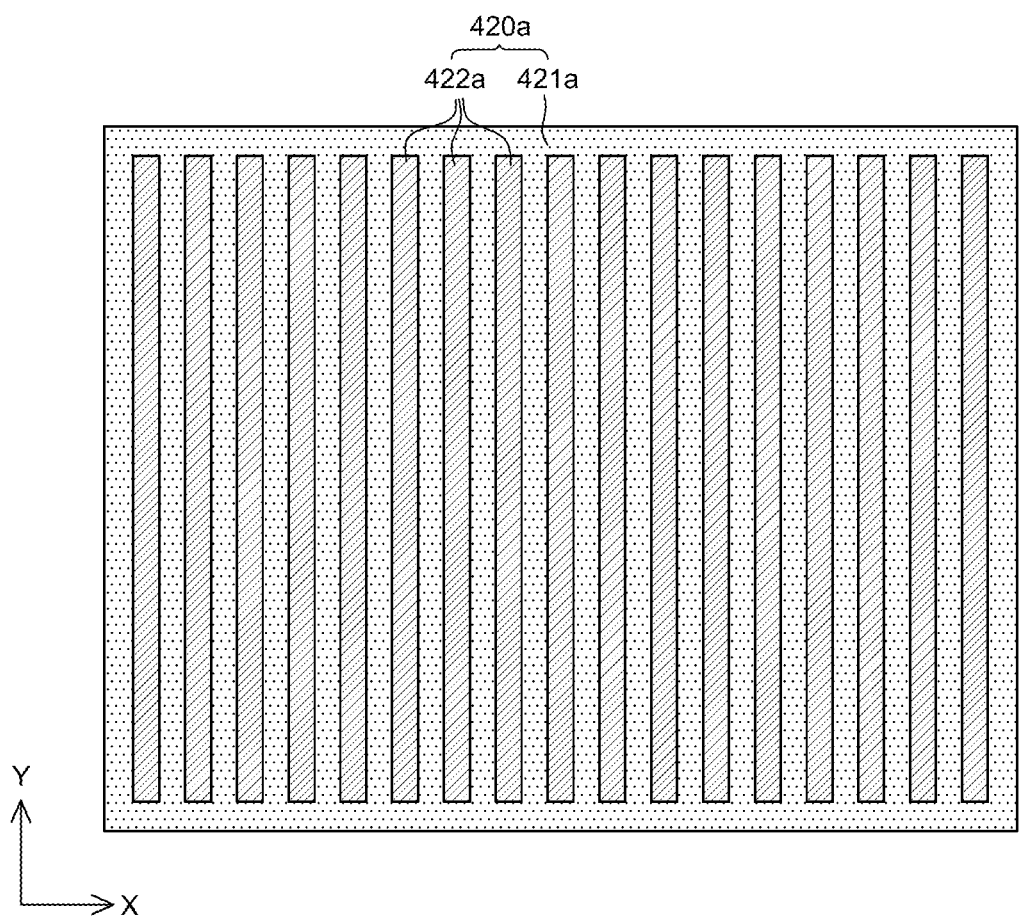
FIGS. 4A to 4C are plan views of viewing angle adjusting films according to various exemplary aspects of the present disclosure.
Figure 4B:
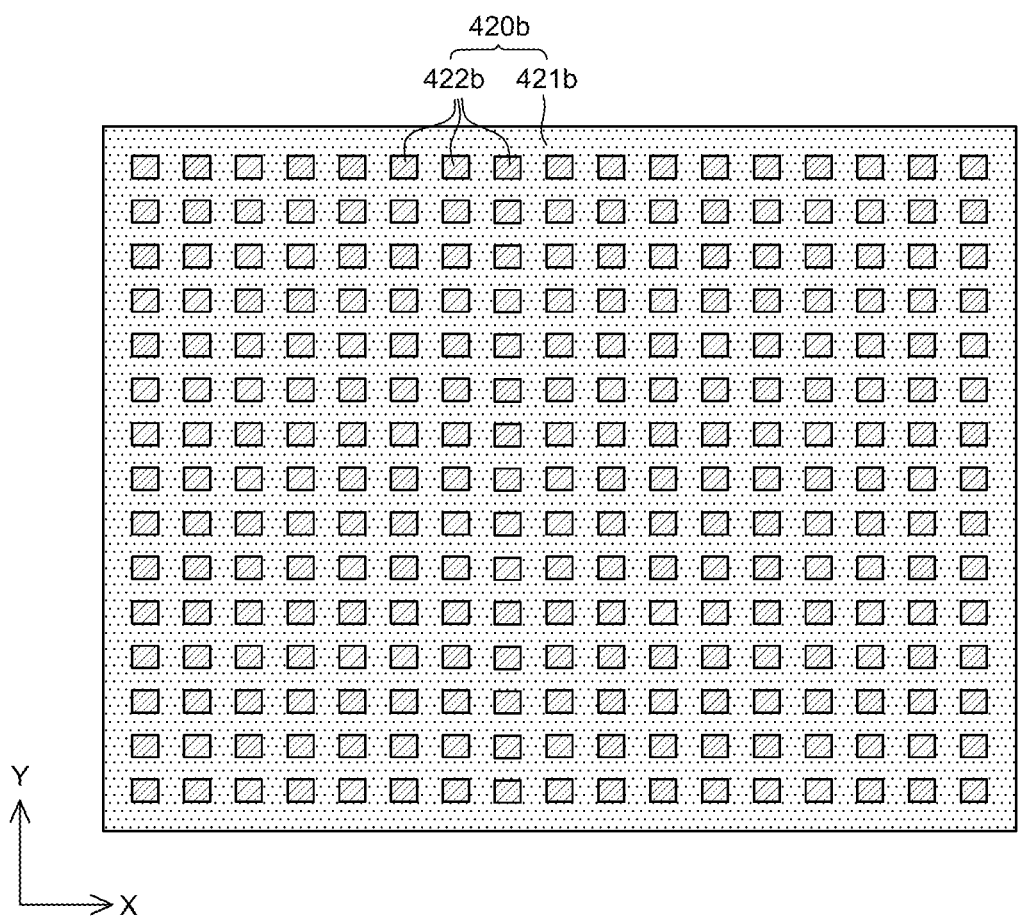
Figure 4C:
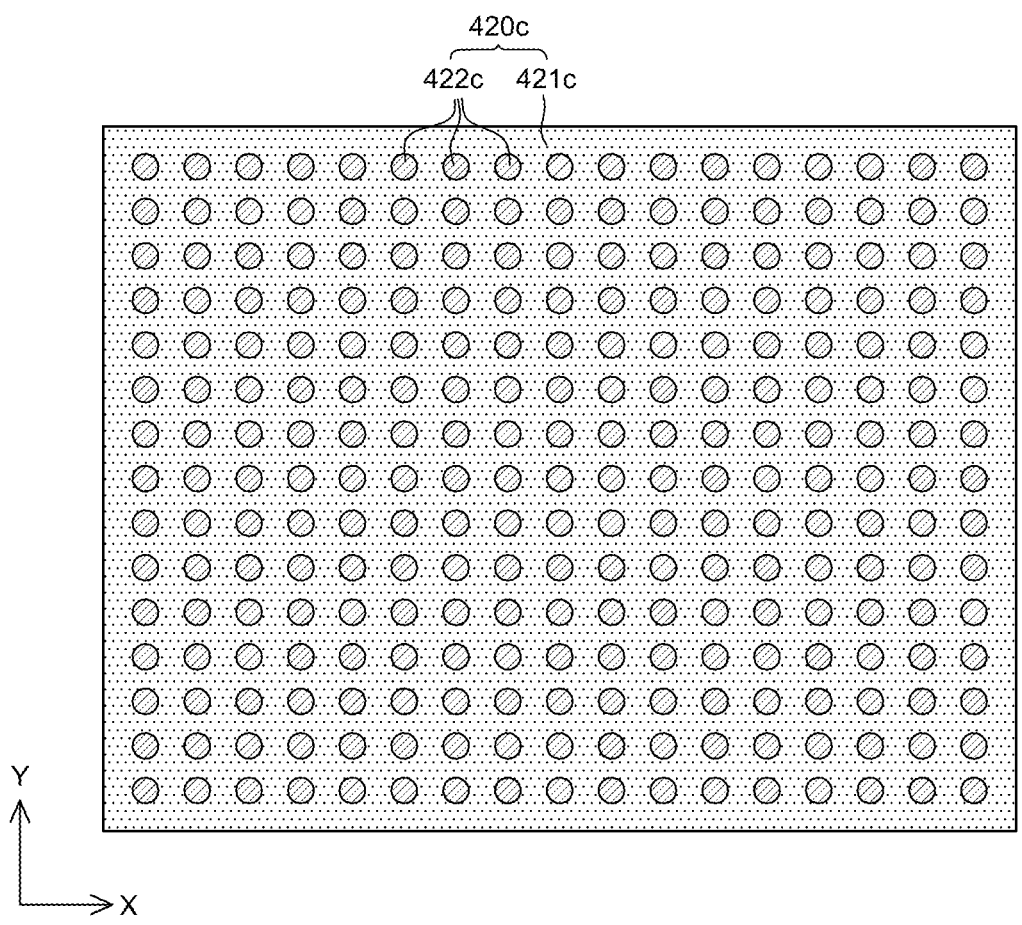

FIGS. 4A to 4C are plan views of viewing angle adjusting films according to various exemplary aspects of the present disclosure. FIGS. 4A to 4C show only plan views of optical films 420a, 420b, and 420c of the viewing angle adjusting films, for convenience of illustration. Cross-sectional shapes of the viewing angle adjusting films of FIGS. 4A to 4C may be similar to that of FIG. 1. Since the optical films 420a, 420b, and 420c of FIGS. 4A to 4C are substantially the same as the optical film 120 of FIG. 1 except for patterned forms, a duplicate description will be omitted.

With reference to FIG. 4A, the optical film 420a includes first areas 421a and second areas 422a. The first area 421a and the second area 422a may be elongated in a first direction (a Y-axis direction) and be disposed in the form of stripes alternately disposed in a second direction (an X-axis direction). In this case, the first area 421a may be a low refractive area having isotropy or anisotropy, and the second area 422a may be a high refractive area having anisotropy. Specifically, in the first direction, the second area 422a may have a refractive index higher than that of the first area 421a. Accordingly, a light path is adjusted at a boundary surface between the first area 421a and the second area 422a due to a difference in refractive indices of the first area 421a and the second area 422a, so that a viewing angle may be adjusted.

With reference to FIG. 4B, the optical film 420b includes first areas 421b and second areas 422b. The second area 422b may have a quadrangular shape. The first areas 421b and the second areas 422b may be formed to be alternately disposed in the first direction (the Y-axis direction) or the second direction (the X-axis direction). In this case, the first area 421b may be a low refractive area having isotropy or anisotropy, and the second area 422b may be a high refractive area having anisotropy. Specifically, in the first direction, the second area 422b may have a refractive index higher than that of the first area 421b. Accordingly, a light path is adjusted at a boundary surface between the first area 421b and the second area 422b due to a difference in refractive indices of the first area 421b and the second area 422b, so that a viewing angle may be adjusted.

With reference to FIG. 4C, the optical film 420c includes first areas 421c and second areas 422c. The second area 422c may be formed in a circular shape. The first areas 421c and the second areas 422c may be alternately disposed in the first direction (the Y-axis direction) or the second direction (the X-axis direction). In this case, the first area 421c may be a low refractive area having isotropy or anisotropy, and the second area 422c may be a high refractive area having anisotropy. Specifically, in the first direction, the second area 422c may have a higher refractive index than the first area 421c. Accordingly, a light path is adjusted at a boundary surface between the first area 421c and the second area 422c due to a difference in refractive indices of the first area 421c and the second area 422c, so that a viewing angle may be adjusted.

Meanwhile, in FIGS. 4A to 4C, the second areas 422a, 422b, and 422c are patterned inside the first areas 421a, 421b, and 421c, respectively, but vice versa. That is, the optical films 420a, 420b, and 420c may be formed in a manner that the first areas 421a, 421b, and 421c are disposed inside the second areas 422a, 422b, and 422c, respectively.

Figure 5:
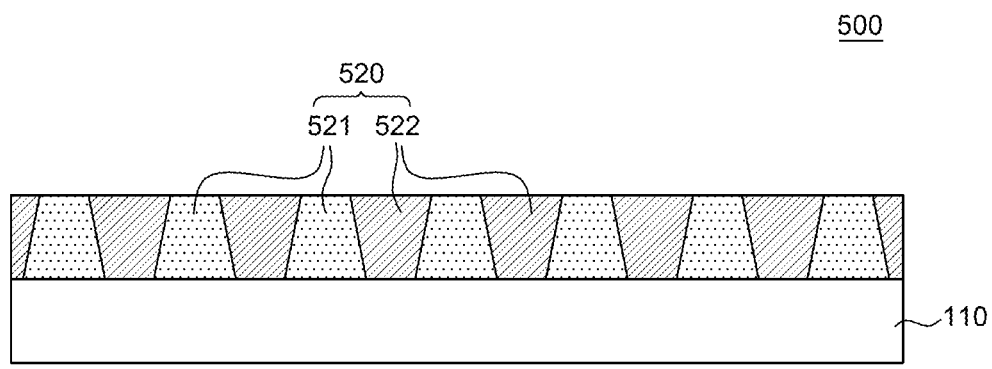
FIG. 5 is a cross-sectional view of a viewing angle adjusting film according to another exemplary aspect of the present disclosure.

FIG. 5 is a cross-sectional view of a viewing angle adjusting film according to another exemplary aspect of the present disclosure. Since a viewing angle adjusting film 500 of FIG. 5 is substantially the same as the viewing angle adjusting film 100 of FIG. 1 except for an optical film 520, a duplicate description will be omitted.

With reference to FIG. 5, the optical film 520 includes first areas 521 and second areas 522 that have different refractive indices. In this case, the first area 521 may be a low refractive area having isotropy or anisotropy, and the second area 522 may be a high refractive area having anisotropy. Specifically, in the first direction, the second area 522 may have a refractive index higher than that of the first area 521. That is, refractive indices nx1, ny1, nz1 of the first area 521 in a first direction (a Y-axis direction), a second direction (an X-axis direction), and a third direction (a Z-axis direction) and refractive indices nx2, ny2, and nz2 of the second area 522 in the first direction, the second direction, and the third direction may have a relationship of ny2>ny1>nx1=nx2=nz1=nz2. Accordingly, a light path is adjusted at a boundary surface between the first area 521 and the second area 522 due to differences in refractive indices of the first area 521 and the second area 522, so that a viewing angle may be adjusted.

The first areas 521 and the second areas 522 may be alternately disposed on the same plane. The first area 521 and the second area 522 may have a shape of any one of the plan views illustrated in FIGS. 4A to 4C. In this case, the boundary surface between the first area 521 and the second area 522 may be formed as an inclined surface. In other words, an upper surface width and a lower surface width of the first area 521 may be different from each other. Also, an upper surface width and a lower surface width of the second area 522 may be different from each other. By forming the boundary surface between the first area 521 and the second area 522 as an inclined surface, light passing through the boundary surface between the first area 521 and the second area 522 may be refracted at an increased angle. Therefore, a viewing angle adjustment of the viewing angle adjusting film 500 may be more effectively performed due to the inclined surface.

Figure 6:
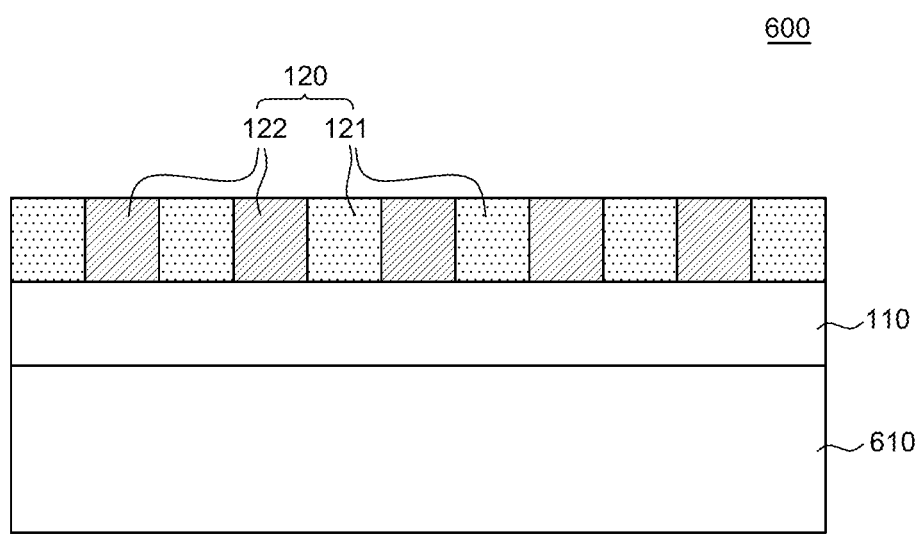
FIG. 6 is a cross-sectional view of a display device to which the viewing angle adjusting film is applied according to an exemplary aspect of the present disclosure.

FIG. 6 is a cross-sectional view of a display device to which the viewing angle adjusting film is applied according to an exemplary aspect of the present disclosure. Since a display device 600 of FIG. 6 is substantially the same as that of FIG. 1 except that it further includes a display panel 610 in addition to the viewing angle adjusting film 100, a duplicate description will be omitted.

With reference to FIG. 6, the display device 600 includes the display panel 610 and the viewing angle adjusting film 100. In this case, the display panel 610 may be implemented as an organic light emitting display panel or a liquid crystal display panel according to a light emission method.

When the display panel 610 is an organic light emitting display panel, the display panel 610 may include a substrate and a display unit.

The substrate is a base substrate for supporting and protecting various components of the display device 600, and may be an insulating substrate. For example, the substrate may be formed of glass or plastic. In some aspects, the substrate may be formed of a material having flexibility so as to be bendable as needed. For example, the substrate may be a thin glass substrate capable of satisfying flexibility, and may be formed of a polymer material such as polyimide (PI), but the present disclosure is not limited thereto.

A display area and a non-display area surrounding the display area may be defined on the substrate. The display area is an area where an image is actually displayed, and a display unit may be disposed in the display area. The non-display area is an area where an image is not displayed, and may be defined as an area surrounding the display area. In the non-display area, various lines such as a gate line and a data line connected to a thin film transistor of the display unit disposed in the display area may be disposed. In addition, a driving circuit, for example, a data driving integrated circuit chip or a gate driving integrated circuit chip, and a plurality of pads may be disposed in the non-display area, but the present disclosure is not limited thereto. A plurality of pixels are defined in the display unit disposed in the display area of the substrate. Each of the plurality of pixels is an individual unit that emits light, and the plurality of pixels may include a red pixel, a green pixel, and a blue pixel. However, the present disclosure is not limited thereto.

The display unit is disposed on the substrate. The display unit can display an image. Although not specifically illustrated in FIG. 6, in this specification, the display unit may be defined as being composed of a display element and a circuit unit for driving the display element. Since the display panel 610 is an organic light emitting display panel, the display element may be an organic light emitting element.

The organic light emitting element includes an anode, a plurality of organic layers, and a cathode to emit light by combining electrons and holes. The plurality of organic layers include a hole injection layer (HIL), a hole transport layer (HTL), an organic emission layer (EML), an electron transport layer (ETL), and an electron injection layer (EIL), but is not limited thereto. Also, the circuit unit of the display unit may include a plurality of thin film transistors (TFT), a capacitor, and a plurality of lines to drive the organic light emitting element.

Meanwhile, the display device 600 may be configured in a top emission or bottom emission type according to an emission direction of light emitted from the display unit. Hereinafter, for convenience of description, it is assumed that the display device 600 according to an exemplary aspect of the present disclosure is a top emission type display device, but it is not limited thereto.

In the case of the top emission type display device, the circuit unit is disposed on the substrate, and the organic light emitting element may be disposed on the circuit unit. More specifically, the thin film transistor is disposed on the substrate, a planarization layer is disposed on the thin film transistor. The anode, the plurality of organic layers including an organic light emitting layer, and the cathode may be sequentially stacked on the planarization layer. At this time, since the display device 600 is a top emission type display device, the anode includes a reflective layer and a transparent conductive layer. The reflective layer may be formed of a material having excellent reflectivity, and may be, for example, silver (Ag) or an alloy including silver. The transparent conductive layer is formed of a transparent conductive material, for example, a transparent conductive oxide (TCO) such as indium tin oxide (ITO), indium zinc oxide (IZO), indium tin zinc oxide (ITZO), zinc oxide (ZnO), and tin oxide (Tin Oxide, TiO).

An encapsulation part for protecting the organic light emitting element from moisture penetrating from the outside of the display device 600 may be disposed on the organic light emitting element. The encapsulation part may be formed by coating an organic material, an inorganic material, or a multilayer film of an organic material and an inorganic material. The encapsulation part may be formed of various inorganic materials such as silicon nitride (SiNx), silicon oxide (SiOx), silicon oxynitride (SiON), polystyrene resin, acrylic resin, epoxy resin, urea resins, isocyanate resin or xylene-resin.

When the display panel 610 is a liquid crystal display panel, the display panel 610 may be implemented by disposing a liquid crystal layer between a first substrate and a second substrate. The first substrate and the second substrate may be bonded to each other by a sealant disposed on an outside of the liquid crystal layer.

The first substrate is a substrate for supporting various components of the display panel 610. The first substrate may be configured similarly to the substrate of the organic light emitting display panel described above. Specifically, various lines and driving elements for driving the display panel 610 may be disposed on the first substrate. For example, a plurality of gate lines, a plurality of data lines, a thin film transistor, a common electrode and a pixel electrode may be disposed on the first substrate. Also, a display area on which an image is displayed and a non-display area surrounding the display area may be defined on the first substrate. The first substrate may be formed of glass or plastic having flexibility.

The liquid crystal layer may be disposed on the common electrode. An arrangement of the liquid crystal layer may be changed by an electric field generated when a data voltage and a common voltage are applied to each of the pixel electrode and the common electrode. The display panel 610 may adjust transmittance of light emitted from a backlight unit by adjusting an arrangement of liquid crystals in a manner described above, thereby displaying an image.

The second substrate is disposed on the liquid crystal layer. A color filter and a black matrix may be disposed between the second substrate and the liquid crystal layer. The second substrate is a substrate for supporting components formed on the second substrate, such as the color filter and the black matrix. The second substrate is disposed to face the first substrate. The second substrate may be formed of glass or plastic having flexibility.

The color filter is to convert light passing through the liquid crystal layer into light of a specific color, and may be configured of, for example, a red color filter, a green color filter, and a blue color filter. The black matrix may distinguish between the color filters and block the light passing through the liquid crystal layer.

The viewing angle adjusting film 100 is disposed on the display panel 610 to adjust a viewing angle of the display device 600. That is, the viewing angle of the display device 600 may be adjusted by collecting or diffusing light incident onto the viewing angle adjusting film 100 from the display panel 610. Meanwhile, when the display panel 610 is a liquid crystal display panel, a lower polarizing film may be further included under the display panel 610. That is, the liquid crystal display panel includes a lower polarizing film and an upper polarizing film 110, and transmission axes of the lower polarizing film and the upper polarizing film 110 may be orthogonal to each other.

Hereinafter, effects of the present disclosure will be described through inventive examples and comparative examples. Here, Inventive Examples 1 and 2 are display devices to which the viewing angle adjusting film according to an exemplary aspect of the present disclosure described with reference to FIG. 1 and FIGS. 3A to 3D was applied. Comparative Examples 1 and 2 are display devices to which a viewing angle adjusting film formed by an imprint method was applied. In addition, Comparative Example 3 is a display device to which no viewing angle adjusting film was applied. Meanwhile, in the viewing angle adjusting films of Inventive Examples 1 and 2 and Comparative Examples 1 and 2, the same polarizing film was used and only optical films were configured differently.

Figure 7A:
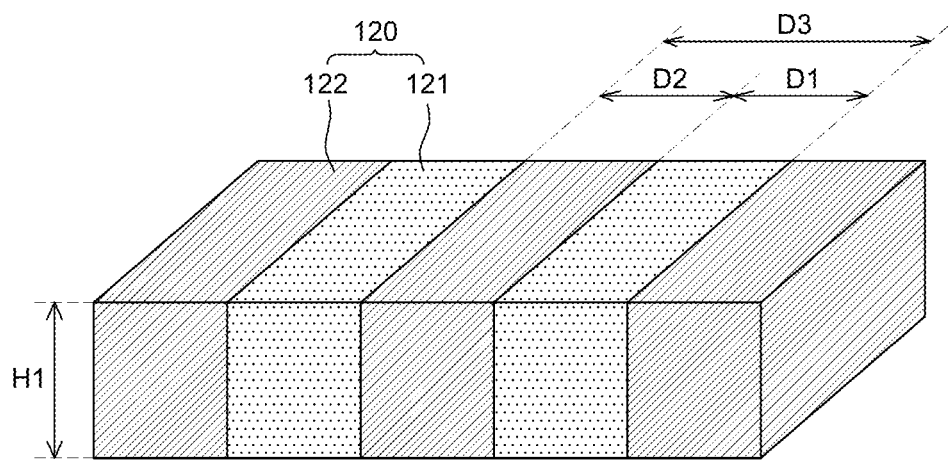
FIGS. 7A and 7B are perspective views of optical films according to Inventive Example and Comparative Example for simulation.
Figure 7B:
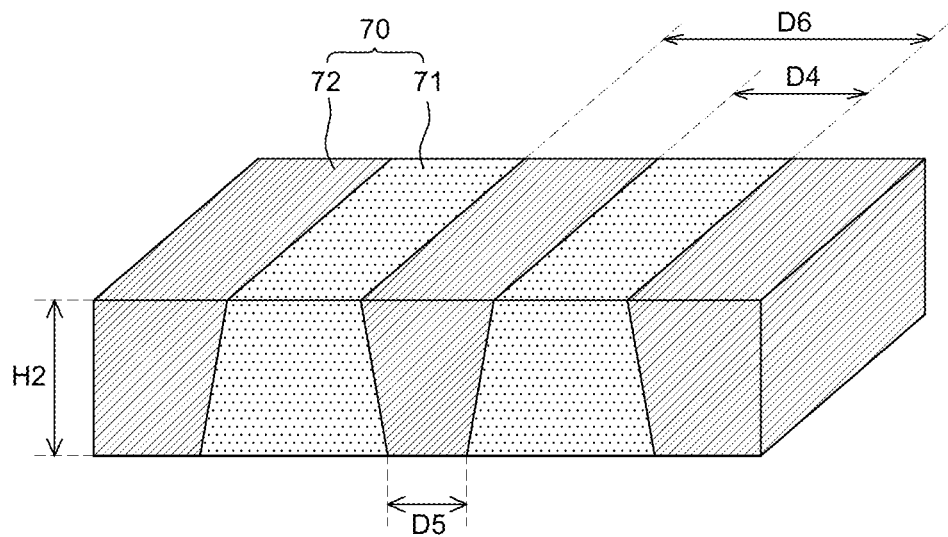

FIGS. 7A and 7B are perspective views of optical films according to the inventive example and the comparative Example for simulation. FIG. 7A shows the optical film 120 corresponding to Inventive Examples 1 and 2, and FIG. 7B shows an optical film 70 corresponding to Comparative Examples 1 and 2. The optical film 120 of FIG. 7A and the optical film 70 of FIG. 7B were formed of the same material. In addition, refractive indices of the first area 121 and the second area 122 of FIG. 7A are the same as those of a first area 71 and a second area 72 of FIG. 7B, respectively.

With reference to FIG. 7A, the optical film 120 according to the inventive examples of the present disclosure includes the first area 121 and the second area 122. In this case, refractive indices of the first area 121 in a first direction (a y-axis direction), a second direction (an x-axis direction), and a third direction (a z-axis direction) were all set equally to 1.55. In addition, a refractive index of the second area 122 in the first direction was set to 1.62, and a refractive index of the second area 122 in the second and third directions was set to 1.55. That is, a difference between the refractive indices of the first area 121 and the second area 122 in the first direction was set to 0.07.

With reference to FIG. 7B, the optical film 70 according to the comparative examples includes the first area 71 and the second area 72. At this time, refractive indices of the first area 71 in the first direction, the second direction, and the third direction were all set equally to 1.55. In addition, a refractive index of the second area 72 in the first direction was set to 1.62, and a refractive index of the second area 72 in the second and third directions was set to 1.55. That is, a difference between the refractive indices of the first area 71 and the second area 72 in the first direction was set to 0.07.

Table 1 shows widths D1, D2 and D3 (µm) and a height H1 (µm) of the optical films 120 according to Inventive Examples 1 and 2 of the present disclosure. Examples 1 and 2 of the present disclosure were set to be the same as each other except for the widths D1, D2 and D3 and the height H1. Table 2 shows widths D4, D5 and D6 (µm) and a height H2 (µm) of the optical films 70 according to Comparative Examples 1 and 2. Comparative Examples 1 and 2 were set to be the same each other except for the widths D4, D5, and D6 and the height H2.

TABLE 1

|  | Inventive Example 1 | Inventive Example 2 |
| --- | --- | --- |
| First Width D1 | 16.0 | 6.1 |
| Second Width D2 | 15.8 | 2.5 |
| Third Width (Pitch) D3 | 31.8 | 8.6 |
| First Height H1 | 15.3 | 4.1 |

TABLE 2

|  | Comparative Example 1 | Comparative Example 2 |
| --- | --- | --- |
| Fourth Width D4 | 16.0 | 4.3 |
| Fifth Width D5 | 9.2 | 2.5 |
| Sixth Width (Pitch) D6 | 31.8 | 8.6 |
| Second Height H2 | 15.3 | 4.1 |

Table 3 compares simulation results of contrast ratios according to positions of display devices of Inventive Examples 1 and 2 and Comparative Examples 1, 2 and 3. In values of the respective Examples shown in Table 3, the value shown on the left of each Example is a value obtained by measuring a contrast ratio, and the value shown on the right of each Example indicates a percentage when it is assumed that a contrast ratio value of Comparative Example 3 is 100%. Table 3 shows the contrast ratios measured using the EZContrast of Eldim. In Table 3, Center means a front, Area A* means a Horizontal Angle ±40° and a Vertical Angle +5°/−25°, and Area A means a Horizontal Angle ±40° and a Vertical Angle +20°/−10°.

TABLE 3

|  | Comparative Example 3 | | Inventive Example 1 | | Comparative Example 1 | | Inventive Example 2 | | Comparative Example 2 | |
| --- | --- | --- | --- | --- | --- | --- | --- | --- | --- | --- |
| Center | 1904.769 | 100% | 1911.552 | 100% | 1748.856 | 92% | 1898.208 | 100% | 1734.193 | 91% |
| Area A* | 249.673 | 100% | 260.5938 | 104% | 272.2957 | 109% | 261.2446 | 105% | 271.8493 | 109% |
| Area A | 508.0674 | 100% | 524.8155 | 103% | 561.8777 | 111% | 522.0256 | 103% | 548.3835 | 108% |

With reference to Table 3, it could be confirmed that Inventive Examples 1 and 2 were identical to Comparative Example 3 in terms of the contrast ratio in the Center but had increased contrast ratios in the Area A* and Area A, as compared to Comparative Example 3. That is, when using the viewing angle adjusting film according to an aspect of the present disclosure, it could be confirmed that the contrast ratios in the Area A* and Area A increase, thereby improving a viewing angle.

In terms of the contrast ratio in the Center, Inventive Examples 1 and 2 were higher than Comparative Examples 2. Therefore, it could be confirmed that the inventive examples were superior to the comparative Examples in terms of the contrast ratio in the Center. In terms of the contrast ratios in Area A* and Area A, it could be confirmed that both of Inventive Example 1 and Comparative Example 1, and Inventive Example 2 and Comparative Example 2 showed contrast ratios and viewing angles that were improved similarly.

Meanwhile, in the case of Inventive Examples 1 and 2, a boundary surface between the first area 121 and the second area 122 was made to be perpendicular to the polarizing film, and in the case of Comparative Examples 1 and 2, a boundary surface between the first area 71 and second area 72 was formed as an inclined surface. When the boundary surface between the first area and the second area is formed as an inclined surface, light collection and diffusion effects can be further improved as compared to the case in which the boundary surface between the first area and the second area is perpendicular to the polarizing film. Accordingly, it could be predicted that the contrast ratios of Inventive Examples 1 and 2 will be substantially the same as or greater than those of Comparative Examples 1 and 2 when the boundary surface between the first area 121 and the second area 122 of Inventive Examples 1 and 2 is formed of an inclined surface.

In addition, in the case of the imprint method, it is difficult to implement a pattern having a pitch of 20 μm or less. That is, Comparative Example 2 is only for simulation and in actually, it may be difficult to implement the widths D4, D5, and D6 shown in Table 2. Therefore, through the optical films according to the aspects of the present disclosure, a pattern having a fine pitch of 20 μm or less may be implemented and at the same time, a viewing angle may be improved.

The exemplary aspects of the present disclosure can also be described as follows:

According to an aspect of the present disclosure, there is provided a viewing angle adjusting film. The viewing angle adjusting film includes a polarizing film having a transmission axis in a first direction. The viewing angle adjusting film further includes an optical film disposed on the polarizing film and including first areas having isotropy or anisotropy and second areas having anisotropy, the first areas and the second areas being alternately disposed. A refractive index of the second areas in the first direction is higher than a refractive index of the first areas in the first direction.

The first areas and the second areas may be alternately disposed on the same plane.

The second areas have a highest refractive index in the first direction.

A refractive index of the first areas and a refractive index of the second areas may be equal to each other in a second direction perpendicular to the first direction on the same plane, and a refractive index of the first areas and a refractive index of the second areas may be equal to each other in a third direction perpendicular to the first direction and the second direction, in a thickness direction.

The refractive index of the first areas in the first direction may be higher than or equal to the refractive index of the first areas in the second direction and the third direction.

The first areas and the second areas may be elongated in the first direction, and the first areas and the second areas may be alternately disposed in the second direction.

Boundary surfaces between the first areas and the second areas may be inclined surfaces.

One of the first areas and the second areas may have a quadrangular or circular shape on a plane parallel to the polarizing film.

A difference in the refractive indices of the first areas and the second areas in the first direction may be 0.02 to 0.4.

A sum of widths of the first areas and second areas may be more than 2 μm.

The first areas and the second areas may include a photo-alignment liquid crystal compound. The photo-alignment liquid crystal compound may include a liquid crystal functional group and a photo-alignment functional group.

According to another aspect of the present disclosure, there is provided a viewing angle adjusting film. The viewing angle adjusting film includes a base substrate. The viewing angle adjusting film further includes an optical film disposed on the base substrate and including a photo-alignment liquid crystal compound. The optical film includes first areas and second areas that are alternately disposed on the same plane. Reflective indices of the first areas are $ny1 > nx1 = nz1$, reflective indices of the second areas are $ny2 > nx2 = nz2$, and $ny2 > ny1 \geq nx1 = nx2 = nz1 = nz2$.

A difference between the $ny2$ of the second areas and the $ny1$ of the first areas may be 0.02 to 0.4.

A sum of widths of the first areas and second areas may be more than 2 μm.

The first areas and the second areas may be elongated in a Y-axis direction, and the first areas and the second areas may be alternately disposed in an X-axis direction.

Boundary surfaces between the first areas and the second areas may be inclined surfaces.

One of the first areas and the second areas may have a quadrangular or circular shape on a plane parallel to the base substrate.

The base substrate may be a polarizing film. The polarizing film may have a transmission axis parallel to a Y-axis.

The photo-alignment liquid crystal compound may include a liquid crystal functional group and a photo-alignment functional group.

According to yet another aspect of the present disclosure, there is provided a display device. The display device includes a display panel. The display device further includes a viewing angle adjusting film on the display panel. The viewing angle adjusting film includes a polarizing film having a transmission axis parallel to a Y-axis and an optical film including a photo-alignment liquid crystal compound on the polarizing film. The optical film includes first areas and second areas that are alternately disposed on the same plane. Refractive indices of the first areas are $ny1 \geq nx1=nz1$, refractive indices of the second areas are $ny2>nx2=nz2$, and $ny2>ny1 \geq nx1=nx2=nz1=nz2$.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A viewing angle adjusting film, comprising:
   a polarizing film having a transmission axis in a first direction; and
   an optical film disposed on the polarizing film and including first areas having isotropy or anisotropy and second areas having anisotropy,
   wherein the first areas and the second areas are alternately disposed, and a refractive index of the second areas in the first direction is higher than a refractive index of the first areas in the first direction.

2. The viewing angle adjusting film of claim 1, wherein the first areas and the second areas are alternately disposed on a same plane.

3. The viewing angle adjusting film of claim 1, wherein the second areas have a highest refractive index in the first direction.

4. The viewing angle adjusting film of claim 1, wherein a refractive index of the first areas and a refractive index of the second areas are equal to each other in a second direction perpendicular to the first direction on a same plane, and
   wherein a refractive index of the first areas and a refractive index of the second areas are equal to each other in a third direction perpendicular to the first direction and the second direction, in a thickness direction.

5. The viewing angle adjusting film of claim 4, wherein the refractive index of the first areas in the first direction is higher than or equal to the refractive index of the first areas in the second direction and the third direction.

6. The viewing angle adjusting film of claim 4, wherein the first areas and the second areas are elongated in the first direction, and the first areas and the second areas are alternately disposed in the second direction.

7. The viewing angle adjusting film of claim 1, wherein boundary surfaces between the first areas and the second areas are inclined surfaces.

8. The viewing angle adjusting film of claim 1, wherein one of the first areas and the second areas has a quadrangular or circular shape on a plane parallel to the polarizing film.

9. The viewing angle adjusting film of claim 1, wherein the first areas and the second areas have a difference in the refractive indices of 0.02 to 0.4 in the first direction.

10. The viewing angle adjusting film of claim 1, wherein a sum of widths of the first areas and second areas is more than 2 μm.

11. The viewing angle adjusting film of claim 1, wherein the first areas and the second areas include a photo-alignment liquid crystal compound,
    wherein the photo-alignment liquid crystal compound includes a liquid crystal functional group and a photo-alignment functional group.

12. A viewing angle adjusting film, comprising:
    a base substrate; and
    an optical film disposed on the base substrate and including a photo-alignment liquid crystal compound,
    wherein the optical film includes first areas and second areas that are alternately disposed on a same plane,
    wherein reflective indices of the first areas are $ny1 \geq nx1=nz1$, reflective indices of the second areas are $ny2>nx2=nz2$, and $ny2>ny1 \geq nx1=nx2=nz1=nz2$.

13. The viewing angle adjusting film of claim 12, wherein a difference between the ny2 of the second areas and the ny1 of the first areas is 0.02 to 0.4.

14. The viewing angle adjusting film of claim 12, wherein a sum of widths of the first areas and second areas is more than 2 μm.

15. The viewing angle adjusting film of claim 12, wherein the first areas and the second areas are elongated in a Y-axis direction and are alternately disposed in an X-axis direction.

16. The viewing angle adjusting film of claim 12, wherein boundary surfaces between the first areas and the second areas are inclined surfaces.

17. The viewing angle adjusting film of claim 12, wherein one of the first areas and the second areas has a quadrangular or circular shape on a plane parallel to the base substrate.

18. The viewing angle adjusting film of claim 12, wherein the base substrate includes a polarizing film that has a transmission axis parallel to a Y-axis.

19. The viewing angle adjusting film of claim 12, wherein the photo-alignment liquid crystal compound includes a liquid crystal functional group and a photo-alignment functional group.

20. A display device, comprising:
    a display panel; and
    a viewing angle adjusting film on the display panel,
    wherein the viewing angle adjusting film includes,
    a polarizing film having a transmission axis parallel to a Y-axis; and
    an optical film including a photo-alignment liquid crystal compound on the polarizing film,
    wherein the optical film includes first areas and second areas that are alternately disposed on a same plane, and wherein refractive indices of the first areas are $ny1 \geq nx1=nz1$, refractive indices of the second areas are $ny2>nx2=nz2$, and $ny2>ny1>nx1=nx2=nz1=nz2$.

* * * * *